(12) United States Patent
Huff

(10) Patent No.: US 9,783,181 B2
(45) Date of Patent: Oct. 10, 2017

(54) METHOD AND APPARATUS OF PROPELLING A VEHICLE

(71) Applicant: Eaton Corporation, Cleveland, OH (US)

(72) Inventor: Gregory D. Huff, Vicksburg, MI (US)

(73) Assignee: Eaton Corporation, Cleveland, OH (US)

( * ) Notice: Subject to any disclaimer, the term of this patent is extended or adjusted under 35 U.S.C. 154(b) by 404 days.

(21) Appl. No.: 14/084,009

(22) Filed: Nov. 19, 2013

(65) Prior Publication Data

US 2014/0141935 A1    May 22, 2014

Related U.S. Application Data

(60) Provisional application No. 61/728,286, filed on Nov. 20, 2012.

(51) Int. Cl.
| | |
|---|---|
| B60W 10/02 | (2006.01) |
| B60W 10/06 | (2006.01) |
| B60W 30/18 | (2012.01) |
| B60W 30/186 | (2012.01) |
| B60W 50/00 | (2006.01) |
| F16H 59/02 | (2006.01) |
| F16H 59/12 | (2006.01) |

(52) U.S. Cl.
CPC ............ *B60W 10/02* (2013.01); *B60W 10/06* (2013.01); *B60W 30/186* (2013.01); *B60W 30/18027* (2013.01); *B60K 2350/104* (2013.01); *B60K 2350/1028* (2013.01); *B60W 2050/0074* (2013.01); *B60W 2510/0638* (2013.01); *B60W 2550/10* (2013.01); *B60W 2710/0661* (2013.01); *B60Y 2200/141* (2013.01); *B60Y 2400/71* (2013.01); *F16H 59/12* (2013.01); *F16H 2059/0243* (2013.01); *Y10T 477/75* (2015.01)

(58) Field of Classification Search
CPC ............................................. B60W 2050/0074
See application file for complete search history.

(56) References Cited

U.S. PATENT DOCUMENTS

| 4,714,144 A | * | 12/1987 | Speranza | ............... B60W 10/02 |
| | | | | 123/352 |
| 5,293,316 A | * | 3/1994 | Slicker | .................. F16D 48/066 |
| | | | | 477/86 |

(Continued)

FOREIGN PATENT DOCUMENTS

| GB | 2508688 A | * | 6/2014 | .......... B60W 50/082 |
| GB | 2523177 A | * | 8/2015 | ...... B60W 30/18027 |

OTHER PUBLICATIONS

Webster's II New Riverside Dictionary, 1984.*
Webster's Encyclopedic Unabridged Dictionary of the English Language, 1989.*

*Primary Examiner* — Robert A Siconolfi
*Assistant Examiner* — Ryan Dodd
(74) *Attorney, Agent, or Firm* — Fishman Stewart PLLC

(57) ABSTRACT

A vehicle includes a clutch that couples an engine to a transmission via a flywheel, a clutch actuator, and a controller configured to receive an obstructed launch command, elevate an engine operation, for a fixed period of time, beyond a typical launch operation upon receipt of the obstructed launch command, and engage the clutch against the flywheel for at least a portion of the fixed period of time.

17 Claims, 3 Drawing Sheets

(56) References Cited

U.S. PATENT DOCUMENTS

| | | | | |
|---|---|---|---|---|
| 5,681,242 A * | 10/1997 | Bates | ................ | B60W 10/02 |
| | | | | 192/103 R |
| 5,863,277 A * | 1/1999 | Melbourne | ........ | B60W 10/06 |
| | | | | 123/339.19 |
| 2004/0033861 A1* | 2/2004 | Wheeler | ............ | B60W 10/02 |
| | | | | 477/83 |
| 2006/0161325 A1* | 7/2006 | Jiang | ................ | B60W 10/02 |
| | | | | 701/54 |
| 2009/0305846 A1* | 12/2009 | Esser | ............... | B60W 10/02 |
| | | | | 477/80 |

* cited by examiner

METHOD AND APPARATUS OF PROPELLING A VEHICLE

CROSS-REFERENCE TO RELATED APPLICATIONS

This application claims priority to U.S. Provisional Patent Application No. 61/728,286, filed Nov. 20, 2012, the contents of which are hereby incorporated in their entirety.

BACKGROUND

When a vehicle is launched the engine is typically engaged with and disengaged from the transmission via a clutch. The clutch includes a disc with a friction coating that is engaged with a flywheel. When the clutch is engaged against the flywheel, the clutch slips for some period of time before engaging or locking against the flywheel. Once engaged, the vehicle may be accelerated by depressing the accelerator and subsequently shifting up through the gears.

In some applications, the vehicle may be caused to stall if the accelerator is not depressed (causing the engine to produce additional torque and engine speed to increase). For instance, automobiles with manual clutches may stall if the clutch is simply released without affecting the accelerator. On the other hand, if the accelerator is depressed too much, a significant amount of clutch slippage can occur, which leads eventually to failure of the clutch.

Heavy and medium duty trucks with their corresponding engines, however, typically generate considerably more torque than that found in consumer-based automotive applications. Thus, in such a vehicle, a manually operated clutch can be slowly released without touching the throttle pedal. An engine idle governor may be used to prevent the engine from stalling by providing additional fuel near the engine idle speed as the clutch closes. This puts minimal energy into the clutch, allowing the clutch to remain as cool as possible and extending clutch life.

Some heavy duty and medium duty vehicles include an Automated Manual Transmission (AMT). In an AMT, the transmission base box is similar to that used in a manual transmission. However, instead of a shift handle, gear selection is automated. Automation could be provided by a pair of electric motors (sometimes referred to as an XY shifter). Further, it is contemplated that there are other methods of shifting besides a set of electric motors, and the XY is one example but an AMT could have another actuation device, including pneumatic devices). Launching a heavy duty or medium duty vehicle using an AMT has many similarities to a similar vehicle with a manual transmission. To maximize clutch life, low engine speeds are used when launching the vehicle. To avoid stalling, though, a transmission controller selects a target engine speed (called the reference speed) for launching the vehicle. A typical reference speed may be 1000 rpm, as compared to a typical idle speed of 700 rpm. A target engine speed for launch may be, in one example such as in a heavy truck application, 300 rpm greater than the idle speed.

In some instances, fleets of heavier duty non-automotive vehicles may be deployed having AMTs. The AMTs are generally preferred to improve clutch life while also improving fuel efficiency. That is, although the engine may not produce peak torque at idle, for a typical launch the amount of torque generated is sufficient to move the vehicle forward from a stopped position. However, inevitably some of the vehicles encounter obstacles that cause resistance to wheel rotation, which may include curbs, deep ruts, and the like. Thus, vehicles having an AMT may struggle, as the engine speed, and therefore the available torque, is low during launch and the target engine speed may provide inadequate available torque when encountering the above obstacles.

Therefore, it is desirable to improve transmission operation of heavier duty non-automotive vehicles having AMTs by controlling events that cause excessive wear to the clutch.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

A vehicle such as a heavy duty or medium duty truck may encounter obstacles like a curb or a rut that prevents normal launch of the vehicle. That is, for vehicles equipped with an Automated Manual Transmission (AMT), low engine speeds are typically used to launch the vehicle to maximize clutch life and improve fuel economy, which may preclude launching the vehicle because of the obstacle.

An exemplary vehicle includes a clutch that couples an engine to a transmission via a flywheel, a clutch actuator, and a controller. The controller is configured to receive an obstructed launch command, elevate an engine operation, for a fixed period of time, beyond a launch operation upon receipt of the obstructed launch command, and engage the clutch against the flywheel for at least a portion of the fixed period of time. The engine operation elevated may include elevation of the amount of torque applied from the engine, beyond a typical reference launch torque, that may overcome an obstruction that is blocking the vehicle. The elevation of the amount of torque may be accomplished by increasing a speed of the engine beyond a speed that is normally used to launch the vehicle, if a path of the vehicle is not generally obstructed (such as on a flat road).

Figure 1:
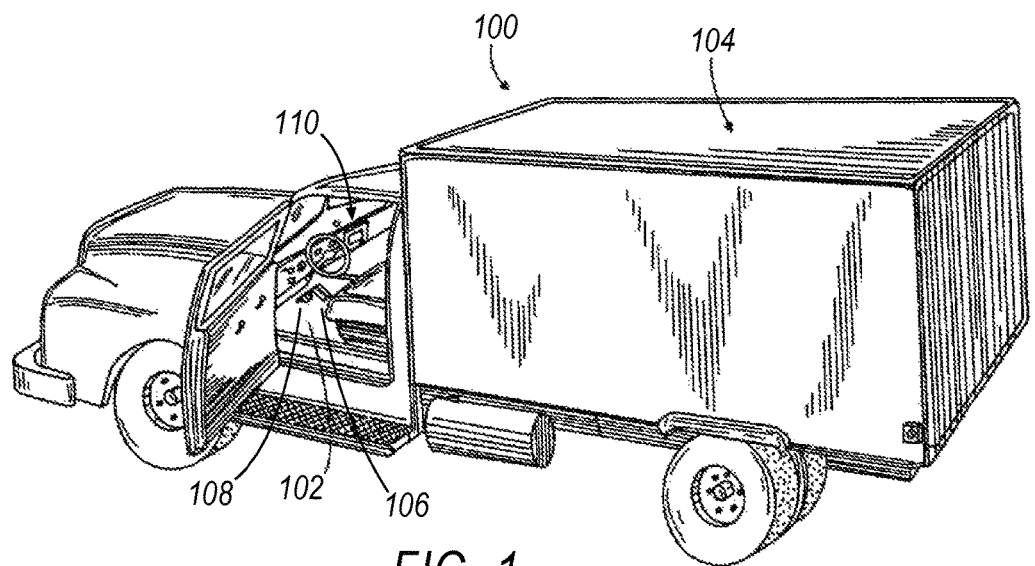
FIG. 1 is an illustration of an exemplary vehicle that incorporates elements of the disclosure.

Another exemplary illustration includes a method of controlling a vehicle that includes receiving an obstructed launch command in a transmission controller, elevating an engine operation of the vehicle, for a fixed period of time, beyond a typical reference launch operation upon receipt of the obstructed launch command, and engaging a clutch against a flywheel for at least a portion of the fixed period of time FIG. 1 illustrates a perspective view of an exemplary medium duty vehicle in the form of a truck that incorporates an AMT. Vehicle 100 includes an operator's cabin 102 and a rear utility section 104. Cabin 102 includes an accelerator 106, a brake pedal 108 for respectively accelerating and braking vehicle 100 and a dashboard 110.

Figure 2:
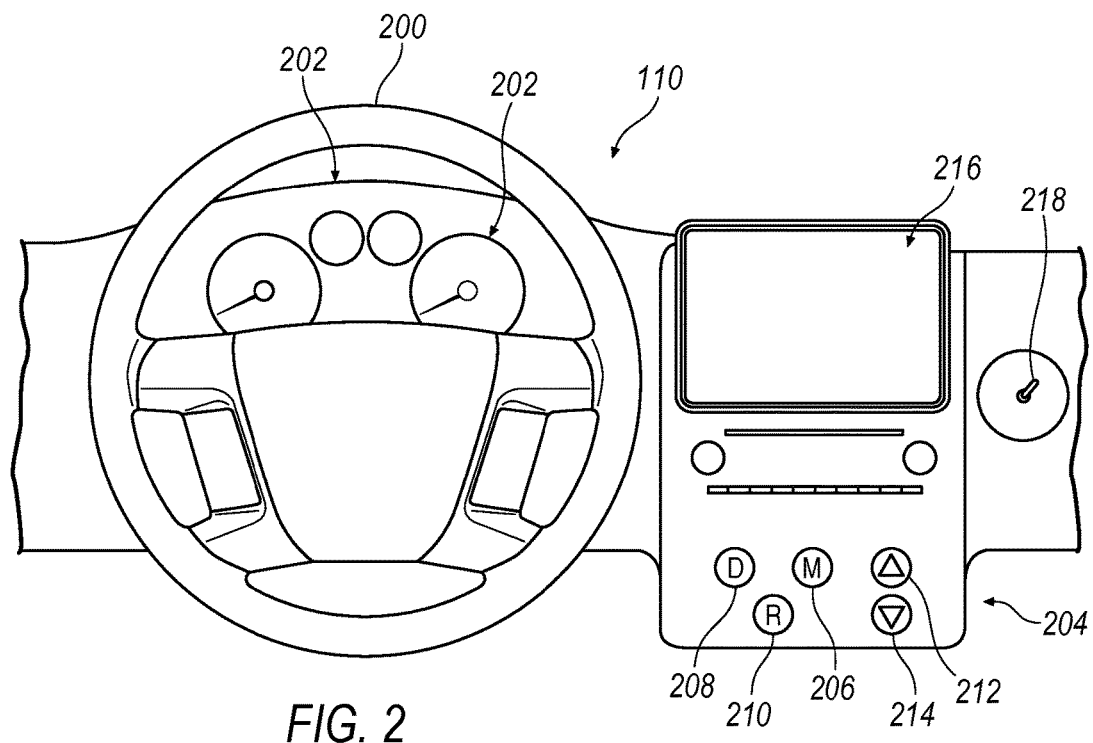
FIG. 2 is an illustration of a dashboard in the vehicle of FIG. 1.

Referring to FIG. 2, dashboard 110 includes a steering wheel 200 extending therethrough and instruments 202 that display vehicle speed, engine speed (e.g., in a tachometer), and the like. Dashboard 110 includes a control area 204 for controlling the AMT, the control area having manually depressible buttons that include a manual transmission operation button 206, a drive button 208, and a reverse button 210. Up and down buttons 212, 214 move the transmission up and down in the gears.

The AMT may be operated in an automatic mode or in a manual mode. In automatic mode, the driver does not need to change the gears at all, but the transmission operates generally in the same manner as a conventional type of an automatic transmission. That is, a controller or computer automatically changes the gear if, for example, the driver is redlining the engine. Such operation may be implemented by depressing drive button 208 in conjunction with pressing on accelerator 106, after which vehicle 100 is caused to launch, beginning in the lowest forward gear and shifting up through the gears as vehicle 100 gains speed. The operator may launch vehicle 100 in reverse as well by pressing reverse button 210 in conjunction with pressing on accelerator 106.

Control area 204 may also be used to operate the AMT in a manual mode as well. Manual mode may be activated by selecting the manual button 206 and pressing on accelerator 106, launching the vehicle beginning in the lowest gear. The AMT is shifted subsequently into higher gears by selecting the "up" button 212, or into lower gears by selecting the "down" button 214. The AMT may, in the alternative, be operated using a computer touch screen, such as touch screen 216 that can detect a tactile motion. While a variety of buttons are shown in the illustrative approach, various arrangements of buttons, knobs or controls may be used to provide the same functionality.

For example, an alternative to buttons could be a mechanical switch 218 mounted to dashboard 110 of the vehicle 100. The switch 218 in one example is a rocker switch, and returns to its original position after the operator selects it.

For example, in an alternative illustrative approach touch screen 216 may be coupled to a computing device (not shown) within vehicle 100, which may in turn be coupled to a controller of the AMT, which will be further described. Touch screen 216 may be icon driven in a fashion comparable to buttons 206-214 of control area 204. That is, instead of having buttons 206-214 that are physically switched, in addition to or in lieu of buttons 206-214, icons may be presented on touch screen 216 that accomplish the same operational function.

In one exemplary illustration, instead of touch screen 216, icons may be presented on a cell phone or a "smartphone" that is capable of executing software applications, or "apps", that interact with a controller or computer within vehicle 10. That is, in addition to conventional cellphone communication capability (e.g., for telephone calls), a cell phone, tablet, smart phone or other similar portable computing device having a processor and a memory may include a wireless communication interface such as Wi-Fi, Bluetooth, near field communication or other known methods for wireless communicating with a separate computing device such as one associated with vehicle 100. Such a portable computing device interfaced with a vehicle-based computing device may be useful for operating the AMT instead of control area 204 or touch screen 216.

Thus, some type of command entry device is used for entering the launch command from the operator, wherein the command entry device including the exemplary devices discussed above. The command entry device may include control area 204 having manually depressible buttons 206-214, switch 218, touch screen 216, or a smartphone "app", as examples.

Figure 3:
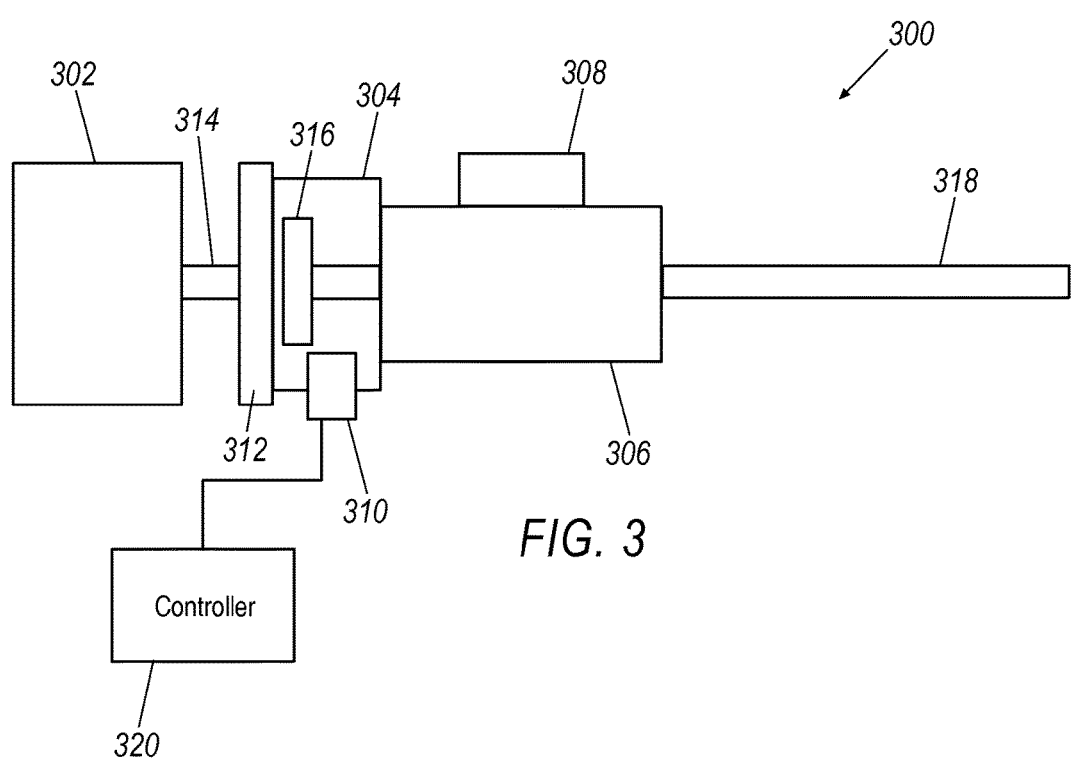
FIG. 3 is an illustration of an engine, clutch, and transmission in the vehicle of FIG. 1.

FIG. 3 is an illustration of an exemplary assembly 300 that is an AMT and includes an engine 302, a clutch housing 304, and a transmission 306. Assembly 300 may be implemented in a vehicle, such as vehicle 100 of FIG. 1. The transmission 306 is a base box that is comparable to those used in traditional manual transmissions. Instead of a shift handle that may be actuated with a clutch pedal, however, gear selection is provided by a pair of electric motors, referred to as an XY shifter 308. That is, the transmission is an AMT that executes gear shifts on the command of a driver or by a computer and using a clutch actuator, and without a clutch pedal (such as a manual clutch pedal that is typically present in a manually operated transmission).

The clutch housing 304 connects the transmission 306 to the engine 302. The clutch housing 304 contains clutch components including a clutch actuator 310 (which replaces a conventional clutch pedal in a manual transmission in a truck). A flywheel 312 is coupled to engine 302 via a shaft 314. The clutch housing 304 may include at least one disc 316 with a friction coating (not shown) rotationally coupled to transmission 306. The transmission 306 is coupled to a drive shaft 318 that is coupled to at least a subset of the wheels of the vehicle 100. A computing device or electronic controller 320, for controlling the AMT, is coupled to assembly 300 and is configured to operate the disc 316 and engine 302 in a manner consistent with the above description. Controller 320 may be operated via pushbutton operation in an operator interface such as control area 204 with control buttons 206-214, switch 218, and/or an operator interface may include icon-driven operation such as with touch screen 216 or an app on a smart phone, as examples. To launch a vehicle, disc 316 closes against flywheel 312. To avoid engine stall and provide for a smooth launch, the disc 316 slips for some period of time before engaging with the flywheel 312.

Figure 4:
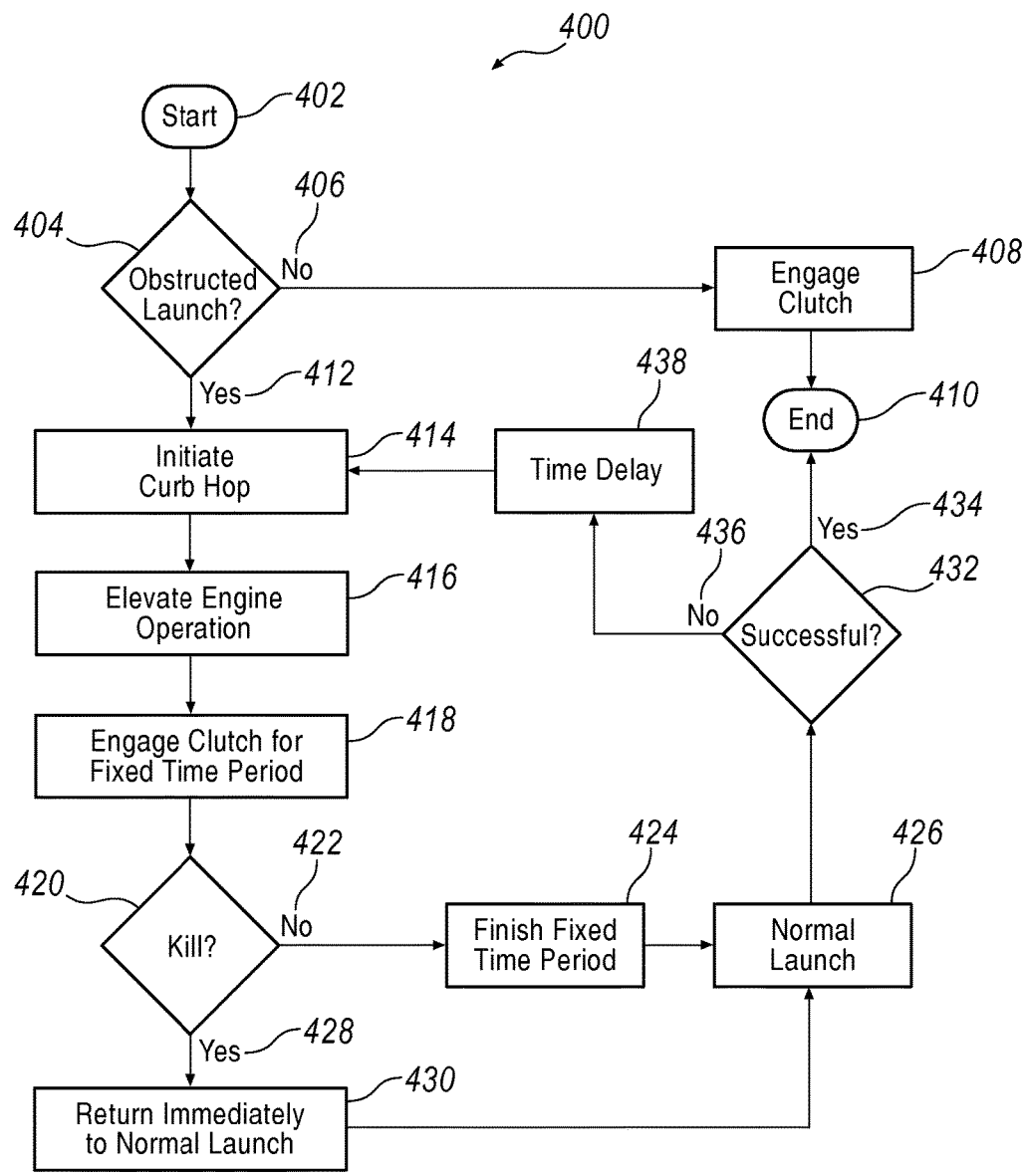
FIG. 4 is an exemplary method of controlling the vehicle of FIG. 1.

Referring to FIG. 4, an exemplary process 400 is disclosed for launching a vehicle having an AMT, such as vehicle 100, according to one example. The process starts at step 402. It then transitions to decision point 404 whether the vehicle is in a position in which an obstruction is present or detected by a driver. The driver may determine that the obstacle will not be overcome using a typical launch of the AMT either by trying a typical launch sequence, or through driver experience. Typically, decision point 404 is invoked when a driver attempts to launch, and then determines that a conventional launch may not cause the vehicle to move, but instead the engine may be caused to stall (or the clutch plate may spin against the flywheel). If the launch is not obstructed as shown at 406 then the clutch is engaged at block 408, and the process ends 410 (at which point the vehicle is successfully launched and moves up through the gears during acceleration of the vehicle).

However, if the launch is obstructed as shown by element 412, then an operator initiated set of steps may be implemented to overcome the obstruction, referred to in one example as a "curb hop". That is, a curb hop may be desired to overcome the one or more obstacles in the path of the vehicle upon initial launch. At step 414, an obstructed launch command or curb hop operation may be initiated using manual switches 206-214, touch screen 216, or an app in a portable computing device of the type discussed above. Moreover, although the term "curb hop" is referred to by way of illustration, it is contemplated that step may be initiated at 414 for overcoming any obstruction that may prevent vehicle launch in low gear, whether in the forward or the reverse direction, and whether the obstruction is a curb, a rut in the road, a log, etc. Further, it is contemplated that the curb hop may be initiated by a vehicle operator such as a driver, or by another passenger within the vehicle. Once a curb hop is initiated at step 414 (that is, a launch command is received), a controller in the vehicle such as controller 316 may cause engine operation to increase, which is accomplished by elevating the engine speed (hence the torque) of engine 302 as shown in step 416. The elevated engine operation (torque or engine speed) is for a fixed or pre-set period of time, beyond a typical reference launch speed upon receipt of the launch command, as shown at step 418. Incidentally, as stated, it is contemplated that the operation of step 416 may occur either in a forward-facing or rearward facing direction, either of which may cause the vehicle to proceed in the desired direction either in an obstructed or an unobstructed launch.

In one example, typically an engine idle speed may be in the range of 700 revolutions per minute (RPM). A typical (unobstructed) reference engine launch may be initiated where the engine launch speed is increased to the range of 1000 RPM (e.g., approximately 300 RPM higher than a traditional engine idle speed noted above). As the clutch 304 engages, engine speed is pulled down and the transmission controller 316 requests more torque from the engine 302 as it tries to maintain the reference speed, which is a target engine speed for a typical launch, and 1000 RPM in one example. Once the clutch is engaged, engine speed is allowed to climb.

The curb hop includes a dramatic increase of the target engine speed during launch. In one example, engine speed is increased 1000 RPM beyond the typical launch speed, after which the clutch is engaged. Also, it is contemplated that speeds well in excess of an additional 1000 RPM may also be implemented, depending on such factors as a "red line" speed (maximum recommended engine speed from the manufacturer), vehicle weight, and the like. The red line speed may be, for instance 5000 RPM, but typically varies from vehicle to vehicle. Thus, in one example, if a vehicle includes an idle speed of 700 RPM, and a typical launch speed is 1000 RPM, then the target engine speed for a curb hop is 2000 RPM in one example, and 5000 RPM in one example. In another example of a heavy duty diesel engine, 2800 RPM is the red line speed and thus would be, in this example, the maximum launch speed during a curb hop operation.

To avoid damage to the clutch, at step 418 the clutch is engaged (at the increased curb hop speed) for a fixed or limited amount of time. In one example, the curb hop mode is entered for approximately a fixed 15 second period, allowing enough time overcome the obstacle. However, it is contemplated that the 15 second period is merely exemplary, and other time periods, such as 10 seconds or 25 seconds, may be implemented, depending on the truck type, its weight, clutch design and capability, and engine type, to name a few examples. However, the amount of speed elevation is related to the amount of time at that speed. For instance, if the amount of torque or engine speed applied is relatively high, then it may be desirable to do so only for a short duration. Conversely, for a relatively lower torque or engine speed, it may be desirable to do so for a relatively longer duration. In fact, any number of curb hop "type" operations may be implemented by controller 316.

That is, a first (relatively easy) curb hop may be implemented to overcome relatively small obstacles (in which a 1000 RPM excess speed may be implemented for 30 seconds), but a second (relatively difficult) curb hop may be implemented to overcome relatively large obstacles (in which a 2000 RPM excess speed may be implemented for 20 seconds). In this example, one of two options may be selected, depending on the type of obstacle present and based on the experience of an operator). In fact, any number of curb hop options may be made available, which may be selected based on unique input commands that are specific to each type of curb hope. And, it is understood that, in general, for higher torque or engine speed operations the fixed time for engagement may be reduced, thus limiting the overall propensity for damage to the clutch. Such options therefore provide different curb hop operations that can be selected.

And, to further reduce or avoid the possibility of damage to the clutch, the number of times that the "curb hop" mode is entered is limited by requiring, in one illustrative approach, a launch command to the transmission controller 316 that includes a series of push button events (on control area 204, switch 218, touch screen 216, or a smart phone app, as examples) for the operator to execute before the curb hop mode is entered, to avoid inadvertent execution of the initiation command. In one example, controller 320 includes a fixed delay between operations such as a few minutes, thereby providing a time for the clutch to cool down after a curb hop operation. In other words, if it were very simple or quick to enter the curb hop mode (e.g., with a single push of a button), then drivers may use the curb hop mode more frequently than is necessary (or it may be inadvertently activated), or at too short of intervals between its execution, which could lead to excessive wear and shortened life of the clutch.

A curb hop mode may be manually entered by pressing a sequence of buttons that the controller recognizes as a command to enter the mode. In one example, an operator may press buttons in the sequence of drive (208)—manual (206)—down arrow (214)—drive (208)—manual (206)—down arrow (214). However, it is contemplated that any sequence of the press buttons may be programmed into controller 316 that will initiate the curb hop operation.

Thus, referring still to FIG. 4, at step 414 a curb hop operation is initiated through a select set of operations. At step 416 the engine operation, such as engine speed, is elevated beyond a normal or typical reference launch speed, and the clutch 316 is engaged against the flywheel 312 at step 418 for a fixed period of time, such as 15 seconds, upon receipt of the launch command. Typically, the curb hop mode is initiated and caused to elevate the engine speed (hence the torque) without an operator ability to stop the operation once it is started. However, in one example, a "kill" switch is provided that enables the operator to discontinue the curb hop operation before completing the fixed time period. If the curb hop mode is entered, but readily overcomes the present obstacle, to avoid unnecessary wear on the clutch the operator may press a kill switch to discontinue the operation. In one example, if up switch 212 is pressed while in curb hop mode (serving to kill the curb hop operation that is in progress), then controller 316 returns operation to a normal launch by returning to the normal or typical reference launch speed.

Thus, at step 420, if no kill occurs 422 during the fixed time period, then at step 424 when the fixed time period is finished or fully elapsed, then controller 316 returns to a normal launch mode, which may include returning to the normal or typical reference launch speed, and/or shifting up through the gears during a normal truck launch and normal truck operation (e.g., moving up through the gears during vehicle acceleration). However, if the curb hop operation is killed 428, then controller 316 returns operation to a normal launch at step 430, and normal launch occurs 426. Thus, at step 418 the clutch is engaged at the elevated engine speed for at least a portion of the fixed period of time. In the example in which a delay between curb hop executions is implemented, at step 432, process 400 assesses whether the launch was successful (which may be visually counted down on touch screen 216, in one example). If the launch was successful 434, the process ends at step 410. If not successful 436, then a time delay may be implemented at step 438, after which control returns to step 414 where a curb hop operation may again be implemented. Once successful 434, process 400 ends at step 410 (at which point the vehicle is successfully launched and moves up through the gears during acceleration of the vehicle). Thus, to overcome obstacles, given a command, the transmission controller can increase torque by increasing the engine launch reference speed for a curb hop event. By limiting higher engine launch reference speeds to unique events commanded, the number of high wear events is limited to a degree, reducing excessive wear on the clutch.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

Reference in the specification to "one example," "an example," "one approach," or "an application" means that a particular feature, structure, or characteristic described in connection with the example is included in at least one example. The phrase "in one example" in various places in the specification does not necessarily refer to the same example each time it appears.

What is claimed is:

1. A vehicle, comprising:
    a clutch that couples an engine to a transmission via a flywheel;
    a clutch actuator; and
    a controller configured to:
        determine a first engine speed that corresponds with an unobstructed launch speed of a vehicle;
        receive an obstructed launch command from an operator of the vehicle, after the operator has determined that a road obstacle will not be overcome using the first engine speed;
        determine a second engine speed that corresponds with an obstructed launch speed of the vehicle;
        elevate an engine operation, for a fixed period of time that is pre-set to a fixed duration of time, to the second engine speed; and
        engage the clutch against the flywheel for the fixed period of time, unless a kill command is received from the operator, wherein if the kill command is received by the operator, then the engine operation is returned to the first engine speed.

2. The vehicle of claim 1, wherein the transmission is an automated manual transmission (AMT) that executes gear shifts and uses a clutch actuator, and without a clutch pedal.

3. The vehicle of claim 1, wherein the vehicle further comprises a command entry device for entering the obstructed launch command, wherein the command entry device is one of a control area having manually depressible buttons, a switch, a touch screen, and a smartphone app.

4. The vehicle of claim 1, wherein the first speed is approximately 1000 RPM, and wherein the controller is configured to elevate the engine speed to the second engine speed of more than 1000 RPM beyond the first speed upon receipt of the obstructed launch command.

5. The vehicle of claim 1, wherein the fixed, preset period of time is an amount that is fixed at approximately 15 seconds.

6. The vehicle of claim 1, wherein, if the kill command is initiated by the operator, the controller is configured to discontinue the elevated engine speed and set the engine speed at the unobstructed launch speed during the pre-set period of time.

7. A method of controlling a vehicle, comprising:
    determining a first engine speed that corresponds with a typical reference launch speed of a vehicle when the vehicle is not obstructed from motion;
    receiving an obstructed launch command in a transmission controller from an operator of the vehicle, after the operator has determined that a road obstacle will not be overcome using the typical reference launch speed;
    elevating an engine speed of the vehicle to a second engine speed that is beyond the first engine speed, for a period of time that is pre-set to a fixed duration of time, upon receipt of the obstructed launch command; and
    engaging a clutch against a flywheel for the fixed period of time, wherein if a kill command is received by the operator, then the engine operation is returned to the first engine speed.

8. The method of claim 7, wherein the transmission is an automated manual transmission (AMT) that executes gear shifts and uses a clutch actuator, and without a clutch pedal.

9. The method of claim 7, further comprising entering the obstructed launch command from a command entry device that is one of a control area having manually depressible buttons, a switch, a touch screen, and a smartphone app.

10. The method of claim 7, wherein the typical reference launch speed is an engine speed of approximately 1000 RPM, the method further comprising elevating the engine speed more than 1000 RPM beyond the typical reference launch speed when elevating the engine speed of the vehicle beyond the typical reference launch speed.

11. The method of claim 7, wherein the, fixed, pre-set period of time is approximately 15 seconds.

12. The method of claim 7, further comprising:
receiving the kill command during the fixed, pre-set period of time;
discontinuing the elevated engine speed; and
setting the engine speed at the typical reference launch speed.

13. A controller for operating a truck, the controller configured to:
determine an engine speed that corresponds with a typical reference launch speed for when the truck is unobstructed;
receive an obstructed launch command from an operator of the truck, after the operator has determined that a road obstacle will not be overcome using the typical reference launch speed;
elevate an engine operation of a truck, for fixed period of time, that is pre-set to a fixed duration of time, beyond the typical reference launch speed upon receipt of the launch command to an obstructed launch engine speed; and
engage a clutch against a flywheel for the fixed period of time, unless a kill command is received from the operator, wherein if the kill command is received by the operator, then the engine operation is returned to the first engine speed.

14. The controller of claim 13, wherein the controller is configured to control operation of a transmission, wherein the transmission is an automated manual transmission (AMT) that executes gear shifts and utilizes a clutch actuator, and without a clutch pedal.

15. The controller of claim 13, wherein the typical reference launch speed is an engine speed of approximately 1000 RPM, and wherein the controller is configured to elevate the engine speed to the obstructed launch speed of at least 1000 RPM beyond the typical reference launch speed upon receipt of the launch command.

16. The controller of claim 13, wherein the engine operation that is elevated is one of an engine speed and an engine torque.

17. The controller of claim 13, wherein the controller is configured to receive the kill command that discontinues the elevated engine speed and sets the engine speed at the typical reference launch speed for any remainder of the fixed period of time once the kill command is received.

* * * * *